United States Patent
Park et al.

(10) Patent No.: US 8,403,087 B2
(45) Date of Patent: Mar. 26, 2013

(54) OUTER-ROTOR TYPE MOTOR AND OUTER-ROTOR TYPE IN-WHEEL MOTOR

(76) Inventors: Gwang-Ju Park, Gyeongsangnam-do (KR); Byung-Gill Ha, Gyeongsangnam-do (KR); Byung-Ju Kang, Gyeongsangnam-do (KR); Do-Hyung Kim, Gyeongsangnam-do (KR); Qyu-Bok Baek, Gyeongsangnam-do (KR); Sung-Min Park, Gyeongsangnam-do (KR); Ki-Yong Ue, Gyeongsangnam-do (KR)

(*) Notice: Subject to any disclaimer, the term of this patent is extended or adjusted under 35 U.S.C. 154(b) by 218 days.

(21) Appl. No.: 12/736,546

(22) PCT Filed: May 26, 2008

(86) PCT No.: PCT/KR2008/002929
§ 371 (c)(1),
(2), (4) Date: Oct. 18, 2010

(87) PCT Pub. No.: WO2009/128581
PCT Pub. Date: Oct. 22, 2009

(65) Prior Publication Data
US 2011/0031803 A1    Feb. 10, 2011

(30) Foreign Application Priority Data
Apr. 18, 2008 (KR) .................. 10-2008-0036163

(51) Int. Cl.
*B60K 7/00* (2006.01)
(52) U.S. Cl. ..................................... 180/65.51; 310/54
(58) Field of Classification Search .............. 180/65.51, 180/65.6, 65.7; 301/6.5; 310/52, 64, 54
See application file for complete search history.

(56) References Cited

U.S. PATENT DOCUMENTS 5,372,213 A * 12/1994 Hasebe et al. ............... 180/65.6
5,852,865 A * 12/1998 Kirtley et al. ................ 29/596

* cited by examiner

*Primary Examiner* — John Walters
(74) *Attorney, Agent, or Firm* — Bacon & Thomas, PLLC

(57) ABSTRACT

An outer rotor-type motor of the present invention comprises a stator block, a stator, a main cooling part, an outer rotor and an outer housing. The stator block is formed in the shape of a cylinder with a rear end closed. The stator block is installed on a shaft passing through a central portion of the rear end thereof. The stator is fixedly installed on an outer circumferential surface of the stator block. The main cooling portion is provided on an inner circumferential surface of the stator block to lower temperature of a corresponding portion. The outer rotor rotatably installed at an outside of the stator and the outer housing has a circumferential portion fixed to a front circumferential portion of the outer rotor.

14 Claims, 8 Drawing Sheets

OUTER-ROTOR TYPE MOTOR AND OUTER-ROTOR TYPE IN-WHEEL MOTOR

TECHNICAL FIELD

The present invention relates to an outer rotor-type motor, and more particularly, to a novel outer rotor-type motor having a cooling structure designed for effectively cooling a stator and a rotor and an outer rotor-type in-wheel motor in which such a structure is employed.

BACKGROUND ART

In general, a motor is classified into a direct-current electric motor or an alternating-current electric motor, depending on the kind of electric power applied thereto. In addition, such a motor is classified into an inner rotor-type motor or an outer rotor-type motor, depending on the arrangement of the stator and the rotor thereof.

An inner rotor-type motor has an arrangement in which the rotor is rotatably installed inside of the stator, and an outer rotor-type motor has an arrangement in which the rotor is rotatably installed outside of the stator.

Among the various types of motors described above, the outer rotor-type motor is employed in various fields as a direct-coupled motor for a washing machine, an in-wheel motor for an electric vehicle, or the like.

Among the above-mentioned outer rotor-type motors, the in-wheel motor can be improved in performance if the cooling efficiency thereof is increased. However, because such a conventional in-wheel motor is poor in cooling efficiency, it is difficult to maximize the performance thereof.

Especially, in order to improve the performance of an outer rotor-type motor, it is most effective to increase the cooling efficiency of the stator thereof. However, because such an outer rotor-type motor is adapted to cool the stator thereof by forming ventilation openings in the rotor thereof in the prior art, the cooling effect achieved thereby is insufficient for obtaining the substantial improvement of the performance of the motor.

Furthermore, because the ventilation holes are formed in an area where the rim wheel of a vehicle wheel is positioned, the air outside of the stator is very minutely introduced into the stator when the vehicle runs. Consequently, it is natural that the practical cooling efficiency is poor.

DISCLOSURE

Technical Problem

The present invention is conceived to solve the aforementioned problems in the prior art. An object of the present invention is to provide a novel outer rotor-type motor for achieving excellent cooling performance and an outer rotor-type in-wheel motor in which the same structure as the outer rotor-type motor is employed.

Technical Solution

In order to achieve the above-mentioned object, there is provided an outer rotor-type motor, comprising: a stator block formed in the shape of a cylinder with a rear end closed, the stator block being installed on a shaft passing through a central portion of the rear end thereof; a stator fixedly installed on an outer circumferential surface of the stator block; a main cooling portion provided on an inner circumferential surface of the stator block to lower temperature of a corresponding portion; an outer rotor rotatably installed at an outside of the stator; and an outer housing having a circumferential portion fixed to a front circumferential portion of the outer rotor and an inside portion rotatably installed on the shaft.

The main cooling part comprises one or more groove recessively formed along an inner circumferential surface of the stator block, the grooves being formed on the inner circumferential surface of the stator block in plural numbers in an axial direction or formed in the shape of a spiral.

In addition, a concavo-convex portion is formed on an inner wall surface of the groove.

The outer rotor-type motor further comprising an auxiliary cooling part provided on an outer circumferential surface of the outer rotor to for heat-exchange with external air.

The auxiliary cooling part comprises one or more grooves recessively formed along an outer circumferential surface of the outer rotor, the grooves being formed on the outer circumferential surface of the outer rotor in plural numbers formed in the shape of a spiral.

In addition, a plurality of first ventilation holes for allowing an internal space of the stator block to communicate with an outside thereof are formed on a rear surface of the stator block.

The outer housing is formed with a plurality of second ventilation holes for allowing the internal space of the stator block to communicate with an outside of the outer housing.

The stator block has a fluid-flow passage formed therein for guiding flow of fluid such as refrigerant, water or gas, and the fluid-flow passage communicates with a cooling device for cooling refrigerant or fluid and then providing it.

The outer rotor-type motor further comprising an inner housing having a circumferential fixed to a rear circumferential of the outer rotor and an inside portion rotatably supported by the stator block.

In addition, a reception groove is formed on a rear circumferential of the stator block in a circumferential direction thereof, and a reception protrusion is formed to protrude on an inner portion of the inner housing to be accommodated and supported in the reception groove.

The outer rotor-type motor further comprising a sealing member contained in the reception groove to seal a gap between the reception groove and the reception protrusion when the reception protrusion is accommodated in the reception groove.

According to another aspect of the present invention, there is provided an outer rotor-type in-wheel motor, comprising: a stator block formed in the shape of a cylinder with a rear end closed, the stator block being installed on a shaft passing through a central portion of the rear end thereof; a stator fixedly installed on an outer circumferential surface of the stator block; a main cooling portion provided on an inner circumferential surface of the stator block to lower temperature of a corresponding portion; an outer rotor rotatably installed at an outside of the stator; and an outer housing having a circumferential portion fixed to a front circumferential portion of the outer rotor and an inside portion rotatably installed on the shaft, wherein the outer housing is fixedly coupled to a wheel, and the shaft is coupled to a vehicle body.

The shaft is coupled to the vehicle body through a knuckle.

The shaft is formed integrally with the knuckle.

Advantageous Effects

The outer rotor-type motor of the present invention as described above has the various advantages as follows.

Firstly, since the outer rotor-type motor of the present invention does not require an additional cooling device, there is an advantage in that it is possible to simplify the overall structure of the outer rotor-type motor as well as to reduce the weight of an article in which the outer rotor-type motor are employed.

Secondly, since the outer rotor-type motor of the present invention is provided with a cooling part for cooling a stator, a cooling efficiency for the stator is enhanced. Thus, there is an advantage in that it is possible to enhance performance of the motor.

In particular, the aforementioned cooling part has the simplest structure, the maximum cooling effect can be achieved, and the light-weighted motor can be obtained.

Thirdly, since the outer rotor-type motor of the present invention can achieve the excellent cooling efficiency and stably operate, it may be advantageous to apply the features to an in-wheel motor.

Fourthly, according to the outer rotor-type motor of the present invention, since the cooling structure is also formed on an outer circumferential surface of an outer rotor, there is an advantageous effect in that performance of the motor can be remarkably enhanced.

Fifthly, according to the outer rotor-type motor of the present invention, since cooling fluid is supplied from an additional cooling device and is then caused to flow through a stator block, there is an advantage in that it is possible to obtain the excellent cooling effect as well as to enhance performance of the motor.

DESCRIPTION OF DRAWINGS

The above and other objects, features and advantages of the present invention will be more apparent after reading the following detailed description taken in conjunction with the accompanying drawings, in which.

BEST MODE

Figure 1:
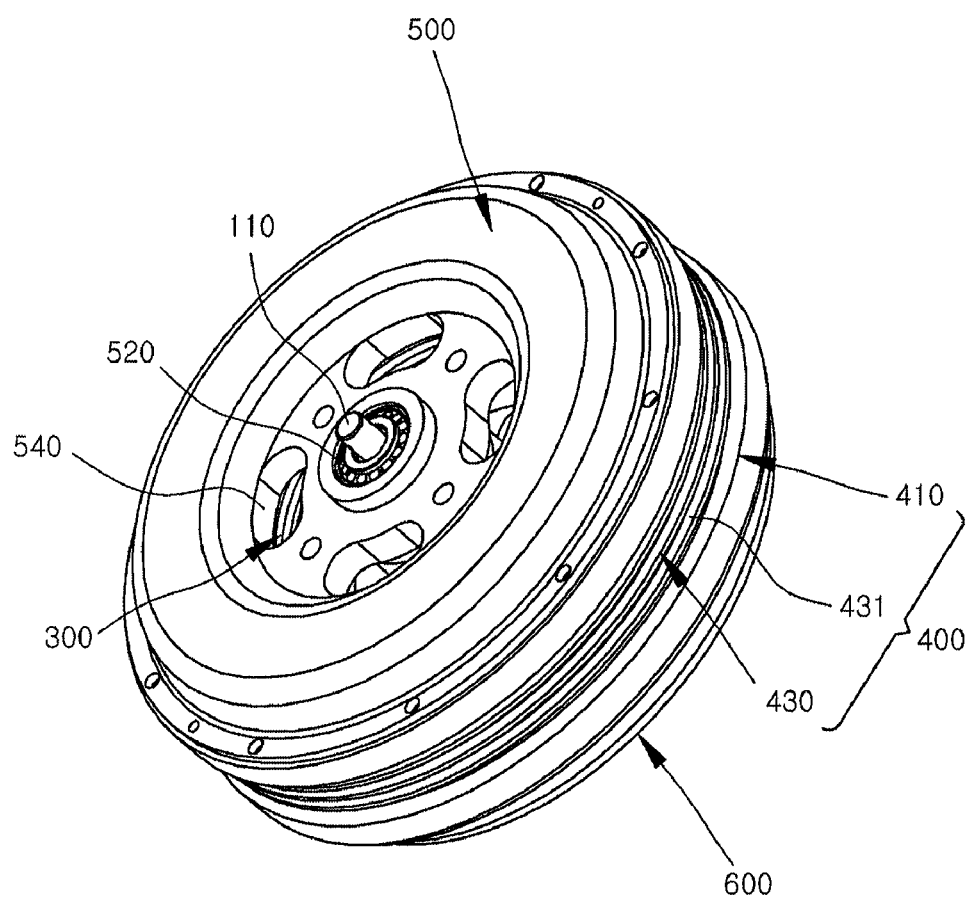
FIG. 1 is a perspective view for describing the outer construction of an outer rotor-type motor according to a first embodiment of the present invention.
Figure 2:
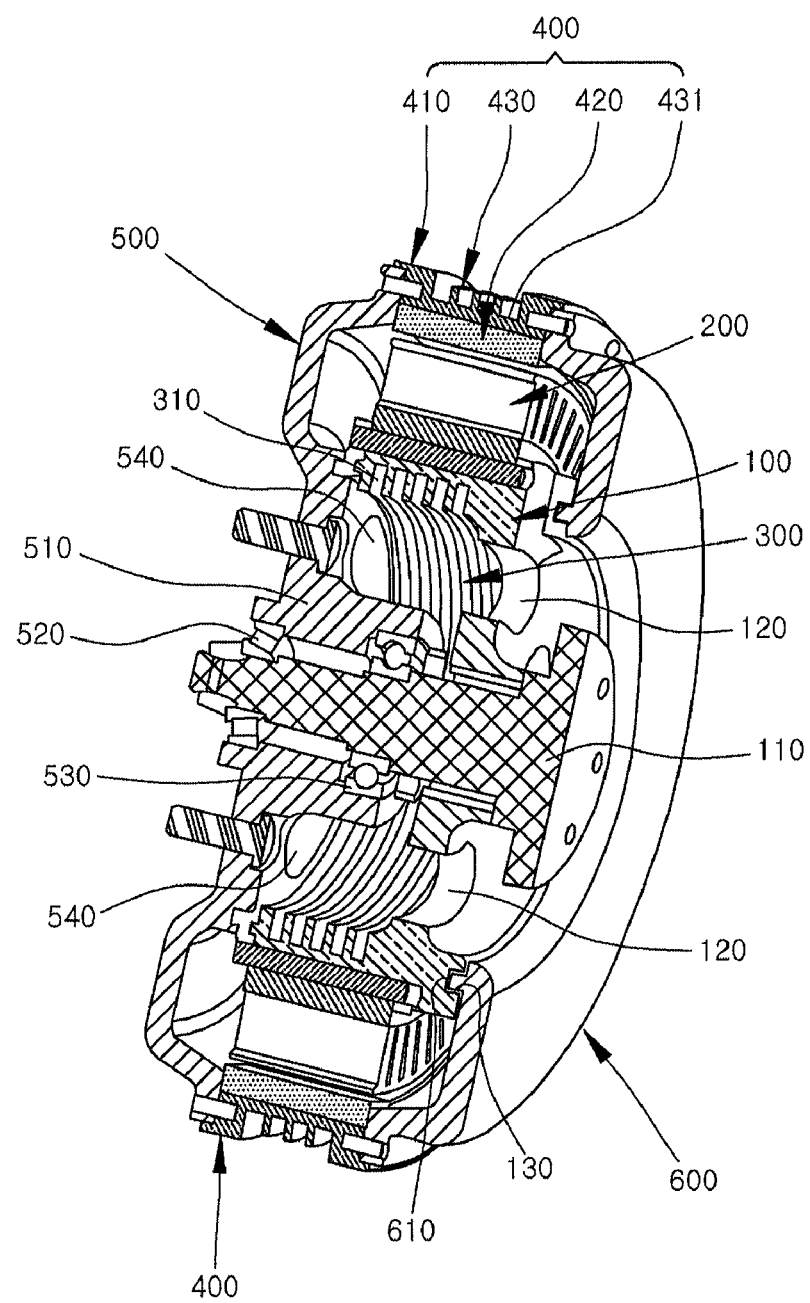
FIG. 2 is a partially cross-sectioned perspective view for describing the inner construction of the outer rotor-type motor according to the first embodiment.
Figure 3:
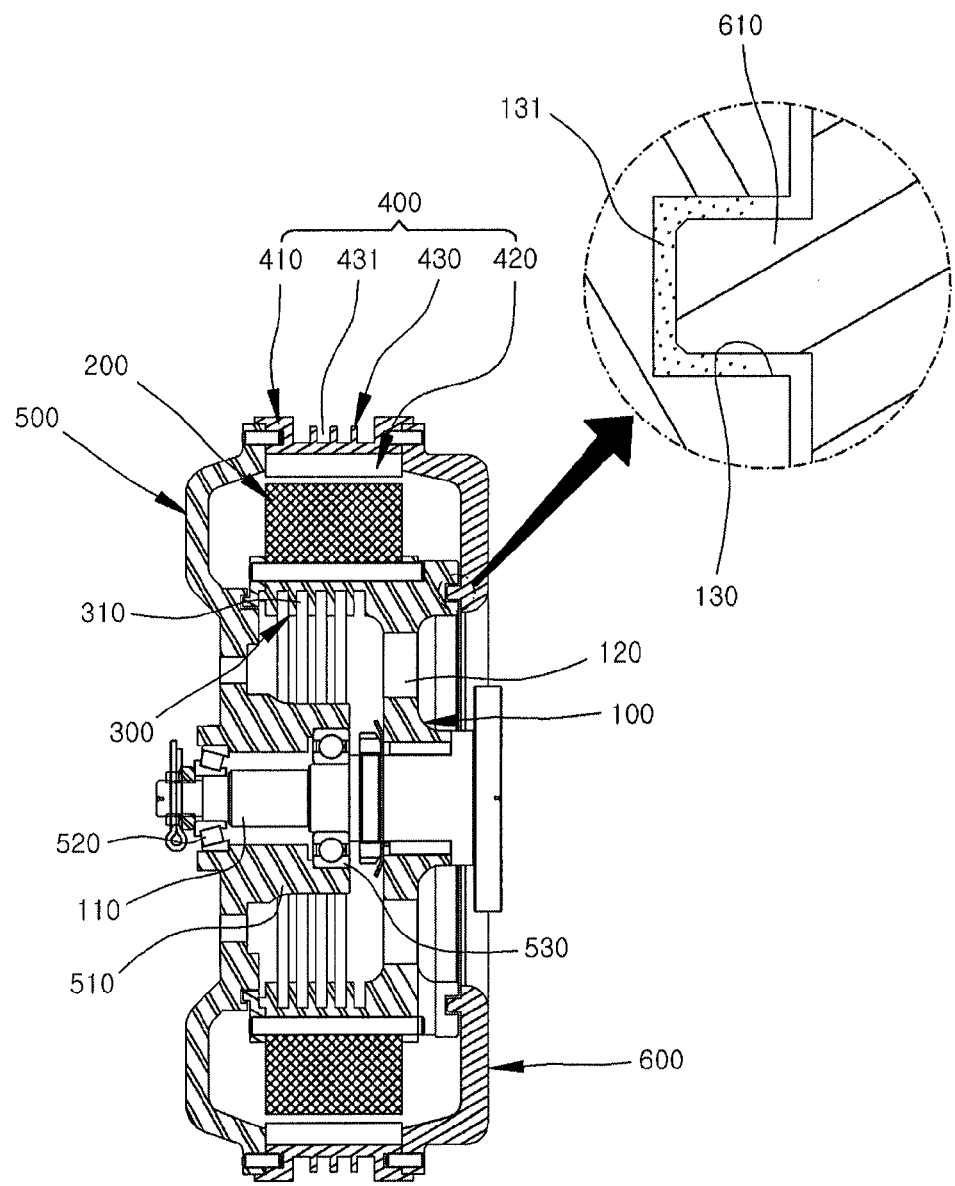
FIG. 3 is a cross-sectional view for describing the inner construction of the outer rotor-type motor according to the first embodiment.

Hereinafter, a preferred embodiment of an outer rotor-type motor according to the present invention will be described in more detail with reference to FIGS. 1 to 4.

An outer rotor-type motor (hereinafter, referred to as "motor") according to the first embodiment of the present invention comprises a stator block 100, a stator 200, a main cooling part 300, an outer rotor 400 and an outer housing 500.

Each of them will be described as follows.

First, the stator block 100 is a portion of an inner body of the motor and has a cylindrical shape with a rear surface closed.

At this time, a shaft 110 passes through an inner central portion of the stator block 100 up to the rear end thereof to be fixedly installed thereto, and a rear portion of the shaft 110 is fixedly installed to an object at which the motor is installed.

Next, the stator 200 is a component which is supplied with external power and generates electromagnetic force, and fixedly installed along an outer circumferential surface of the stator block 100.

Then, the main cooling part 300 is a component which lowers the temperature of the stator block 100 and thus causes the temperature of the stator 200 to be reduced to thereby enhance performance of the motor.

The aforementioned main cooling part 300 is provided on an inner circumferential surface of the stator block 100. In particular, the main cooling part 300 of the embodiment of the present invention comprises a groove 310 recessively formed along the inner circumferential surface of the stator block 100.

Of course, the main cooling part 300 may comprise protrusions formed to protrude on the inner circumferential surface of the stator block 100. In such a case, however, the weight of the motor may be increased and a flow passage formed on the inner circumferential surface of the stator block 100 is reduced, so that substantial cooling performance cannot be enhanced remarkably.

Accordingly, it is preferable that the main cooling part 300 comprise the groove 310 to reduce the overall weight of the motor and to secure a sufficient space through which air flows.

Particularly, it is proposed in the first embodiment of the present invention that grooves 310 are formed on the inner circumferential surface of the stator block 100 in plural numbers in the axial direction to thereby more enhancing heat-exchange performance. It will be apparent that a groove 310 may be formed in the shape of a spiral which connects a front portion of the inner circumferential surface of the stator block 100 to a rear portion thereof.

In addition, it may be more preferable that a concavo-convex portion (not shown) be formed on an inner wall surface of the groove 310. This is because a surface area of the groove 310 to be in contact with external air is maximized to thereby more enhancing the heat-exchange performance obtained by the groove 310. At this time, the concavo-convex portion may be formed in various manners, for example by additionally forming a plurality of protrusions, forming the inner wall surface to be coarse, or forming general, repeated recesses and protrusions.

Next, the outer rotor 400 is a component for constituting the motor together with the stator 200 and is rotatably installed at an outer portion of the stator 200.

At this time, the outer rotor 400 includes a cylindrical rotor frame 410 and a plurality of magnets 420 installed along an inner circumferential surface of the rotor frame 410.

Particularly, in the first embodiment of the present invention, an auxiliary cooling part 430 is further provided on an outer circumferential surface of the rotor frame 410 of the outer rotor 400.

At this time, the auxiliary cooling part 430 comprises a groove 431 concavely formed on the outer circumferential surface of the rotor frame 410 in the circumferential direction. Here, grooves 431 may be formed in plural numbers of the rotor frame 410, or a groove 431 may be formed in the shape of a spiral.

The auxiliary cooling part 430 as described above serves to increase a heat-exchange area with respect to the outer rotor 400, thereby enhancing the cooling performance of the motor as well as the efficiency of the motor. In addition, the auxiliary cooling part allows the weight of the rotor frame 410 to be reduced, thereby reducing the overall weight of the motor.

Of course, like the inner wall surface of the groove 410 of the main cooling part 300, it is more preferable that an inner wall surface of the groove 431 of the auxiliary cooling part 430 is formed with a concavo-convex portion to enhance the cooling performance.

Next, the outer housing 500 is a component for rotatably supporting the outer rotor 400. A circumferential portion of the outer housing is fixed to a front circumferential portion of the outer rotor 400, and an inner portion thereof is rotatably installed on the shaft 110.

Here, the inner portion of the outer housing 500 is formed to surround front surfaces of the stator 200 and the stator block 100, and a central portion of the outer housing 500 is formed with a hub 510, which surrounds the shaft 110 and is supported by the shaft 110.

At this time, a plurality of bearings 520 and 530 are installed between an inner circumferential surface of the hub 510 and an outer circumferential surface of the shaft 110, so that the hub 510 can be rotated smoothly with respect to the shaft 110.

Also, in the first embodiment of the present invention, a plurality of first ventilation holes 540, which allow an internal space of the stator block 100 to communicate with the outside of the outer housing 500, are formed at a portion of the outer housing 500, in which the internal space of the stator block 100 is positioned.

The plurality of first ventilation holes 540 are to allow the air outside of the motor to be introduced into the internal space of the stator block 100 or allow the air in the internal space of the stator block 100 to be discharged out of the motor during the rotation of the outer rotor 400, so that the cooling efficiency can be more enhanced.

In addition, in the first embodiment of the present invention, a plurality of second ventilation holes 120 are further formed on a rear surface of the aforementioned stator block 100 for allowing the internal space of the stator block 100 to communicate with the outside of the motor.

Along with the aforementioned first ventilation holes 540, the second ventilation holes 120 allow the air to be introduced and discharged smoothly, thereby causing the cooling efficiency for the stator 200 of the motor to be maximized.

At this time, the first ventilation holes 540 and the second ventilation holes 120 may be formed to have various shapes. For example, all the first and second ventilation holes 540 and 120 may be formed in a circular or elliptical shape as well as a polygonal shape. Of course, it is most preferable that each of the holes 540 and 120 be shaped to enable the air to be smoothly introduced and discharged even if the outer housing 500 is rotated.

In the meantime, the motor according to the first embodiment of the present invention further comprises an inner housing 600.

The inner housing 600 is a component for supporting the outer rotor 400 more stably during the rotation of the outer rotor and for preventing various foreign materials from being introduced into the stator 200.

The inner housing 600 is formed in the shape of a ring with an inside portion opened. The inner housing 600 is formed to have a circumferential portion fixed to a rear circumferential portion of the outer rotor 400 and an inside portion rotatably supported by the stator block 100.

At this time, a reception groove 130 is formed on a rear circumferential portion of the stator block 100 in the circumferential direction, and a reception protrusion 610, which is accommodated and supported in the reception groove 130, is formed to protrude on an inner portion of the inner housing 600.

In particular, a sealing member 131 is provided within the reception groove 130 in order to seal a gap between the reception groove 130 and the reception protrusion 610 when the reception protrusion is accommodated in the reception groove. The sealing member 131 may comprise grease, or oil with large viscosity. The sealing material 131 is provided for preventing moisture and various foreign materials from being introduced through the gap between the reception groove 130 and the reception protrusion 610.

Hereinafter, the operation of the motor according to the first embodiment of the present invention as described above will be described.

First of all, if the motor is supplied with power, the rotor frame 410 of the outer rotor 400 is rotated by the electromagnetic force generated in the stator 200.

At this time, the rotor frame 410 is coupled to the outer housing 500 and the inner housing 600, and the hub 510 of the outer housing 500 is rotatably installed on the shaft 110. In addition, the reception protrusion 610 of the inner housing 600 is accommodated in the reception groove 130 of the stator block 100. Considering the foregoing, the rotor frame 410 is rotated by the outer housing 500 and the inner housing 600 while being supported by the shaft 110 and the stator block 100.

In particular, during a series of the above processes, the air outside of the motor is introduced into the internal space of the stator block 100 via the first ventilation holes 540 formed on the outer housing 500. Subsequently, the introduced air passes through the internal space of the stator block 100 and then through the second ventilation holes 120 formed on the rear surface of the stator block 100 and the open inside of the inner housing 600e sequentially, and is finally discharged to the outside of the motor.

At this time, the air introduced into the internal space of the stator block 100 via the first ventilation holes 540 is heat-exchanged with the stator block 100 by the main cooling part 300 formed on the inner circumferential surface of the stator block 100, thereby lowering the temperature of the stator block 100. Accordingly, since the temperature of the stator 200 is also lowered, that performance of the motor can be substantially enhanced.

Further, during the rotation of the outer rotor 400, the outer rotor is heat-exchanged with the external air by the auxiliary cooling part formed on the outer circumferential surface of the rotor frame to lower the temperature of the rotor frame, thereby preventing the problem that an increase of the temperature of the outer rotor 400 influences an increase of the temperature of the stator 200.

Figure 4:
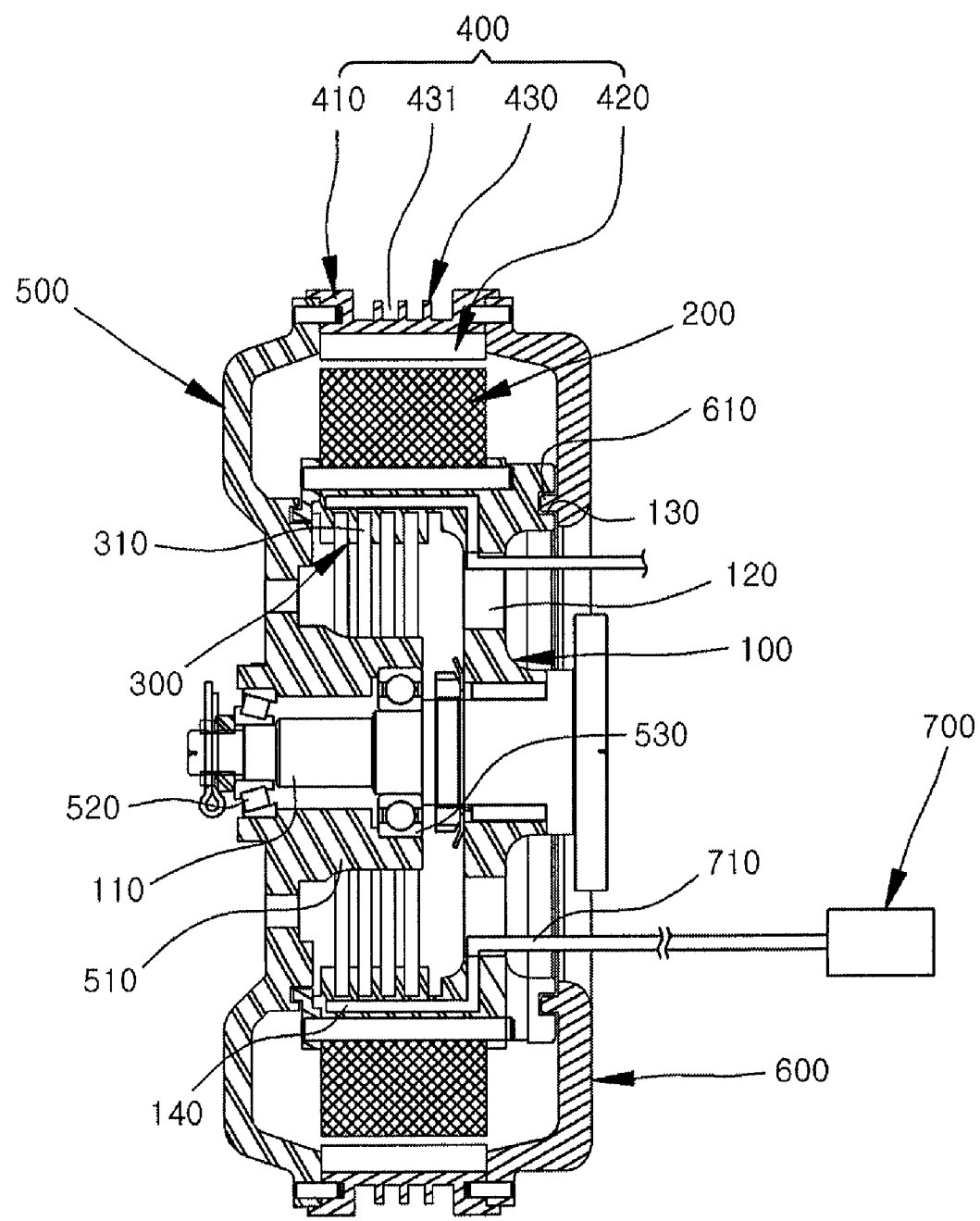
FIG. 4 is a cross-sectional view for describing the inner construction of an outer rotor-type motor according to a second embodiment of the present invention.

In the meantime, FIG. 4 illustrates the configuration of an outer rotor-type motor according to a second embodiment of the present invention.

The second embodiment of the present invention is to enhance the cooling efficiency for the stator 200 and to cause the temperature of the stator block 100 to be remarkably reduced using an additional cooling device 700 for a refrigeration cycle.

That is, a fluid-flow passage 140 for guiding the flow of fluid such as refrigerant, water or gas is formed in the stator block 100 along a portion adjacent to the main cooling part 300, and the fluid-flow passage 140 is configured to communicate with the cooling device 700, which cools refrigerant or fluid and then supplies it.

At this time, considering the stator block 100 which is in a fixed state, it is possible to connect the stator block 100 to the cooling device 700 through the various kinds of tubes 710 (for example, a refrigerant tube).

In addition, FIGS. 5 to 8 illustrate one example, in which the outer rotor-type motor according to the first embodiment of the present invention is constructed as an in-wheel motor utilized in a fuel cell vehicle.

Figure 5:
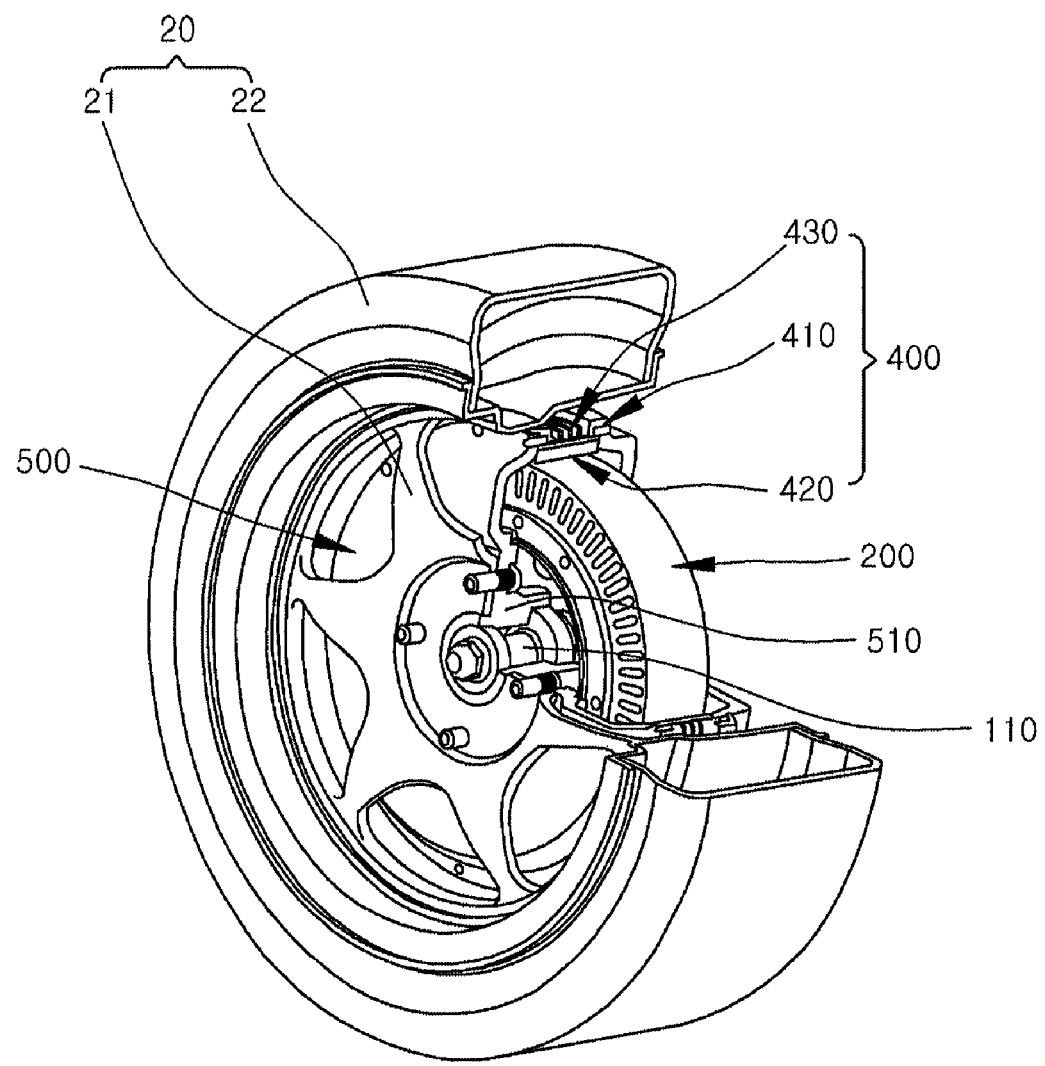
FIG. 5 is a partial cut-away perspective view showing a state in which the outer rotor-type motor according to the first embodiment is constructed as an in-wheel motor and applied to a vehicle wheel.
Figure 6:
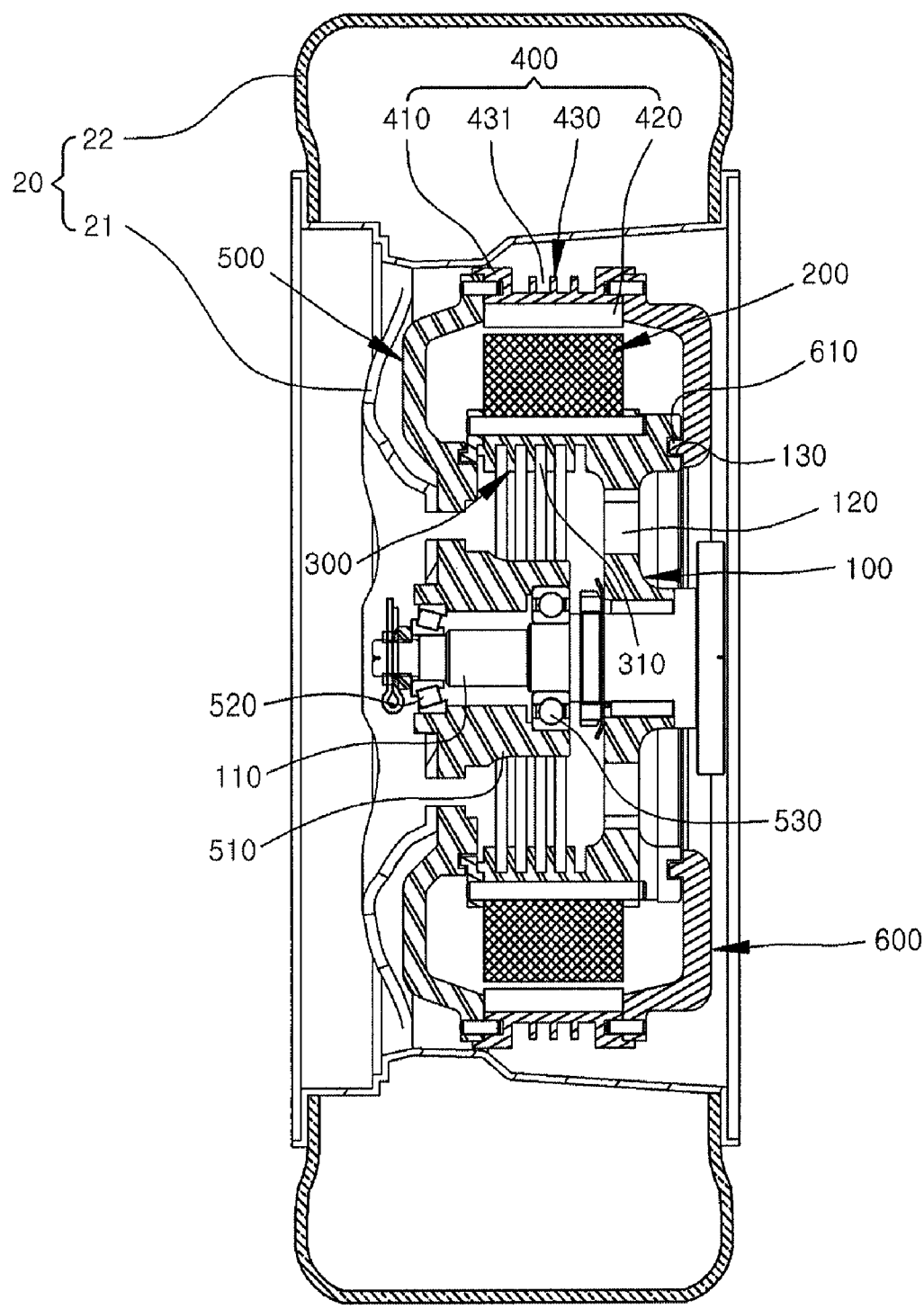
FIG. 6 is a cross-sectional view showing a state in which the outer rotor-type motor of the first embodiment is constructed as an in-wheel motor and applied to a vehicle wheel.

That is, in a case where the outer rotor-type motor according to the first embodiment of the present invention is constructed as the in-wheel motor, the outer housing 500 is fixedly coupled to a rim wheel 21 of a wheel 20 as shown in FIGS. 5 and 6. At this time, a tire 22 of the wheel 20 is placed along an outer circumferential portion of the outer rotor 400 of the in-wheel motor.

Figure 7:
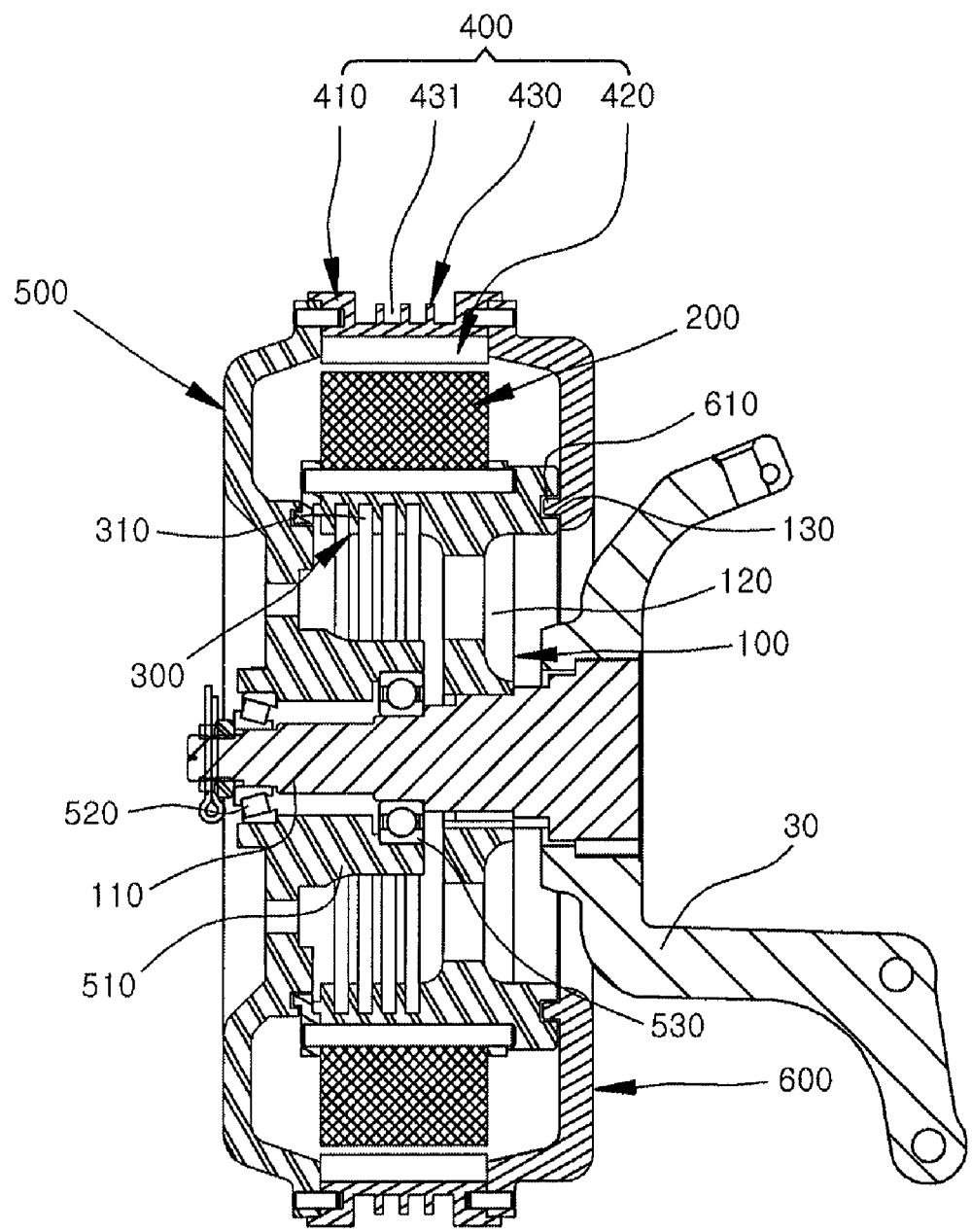
FIGS. 7 and 8 are cross-sectional views for describing examples of constructing the outer rotor-type motor of the first embodiment as an in-wheel motor, and coupling it with a knuckle.
Figure 8:
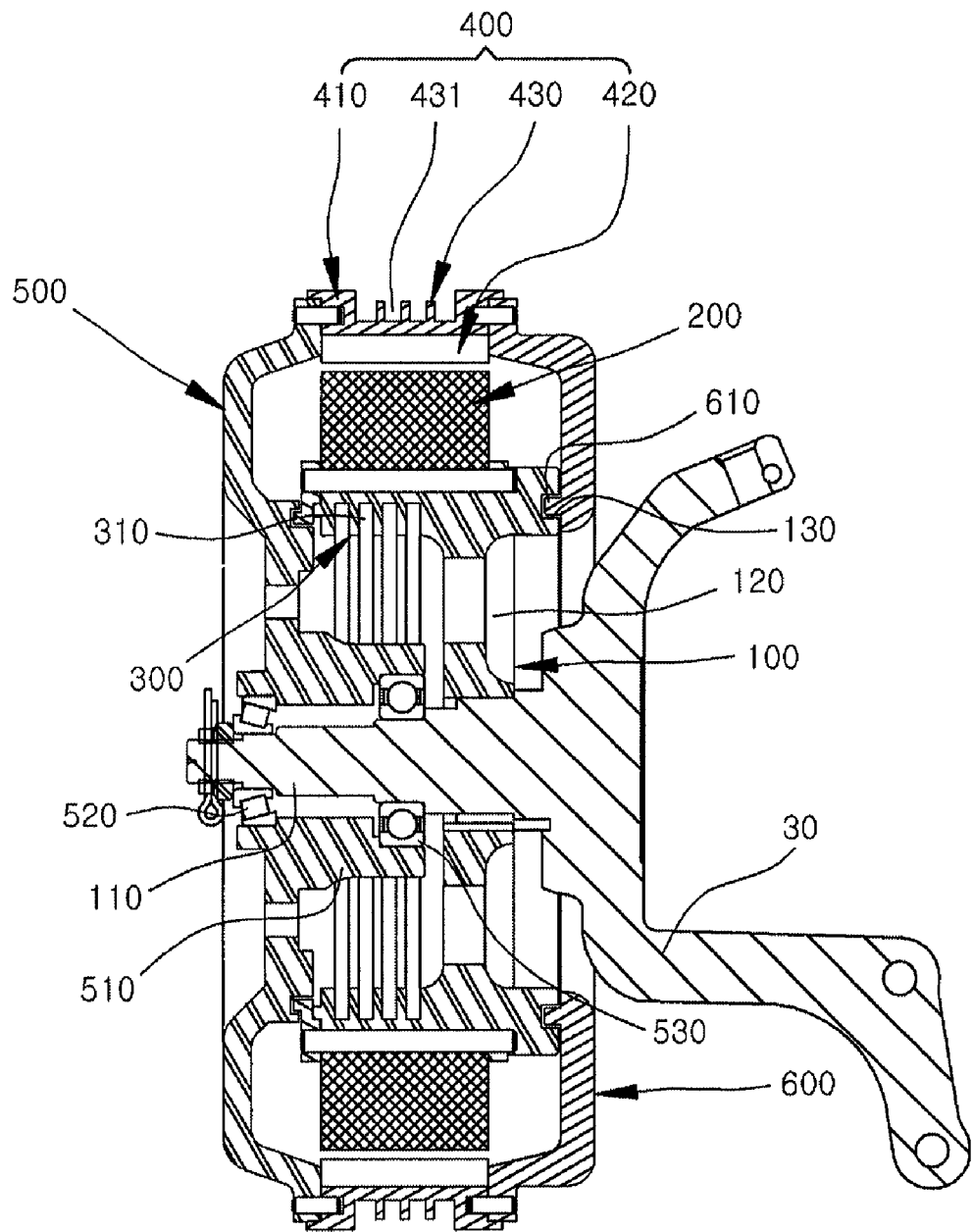

In addition, as shown in FIGS. 7 and 8, a rear surface of the shaft 110 is fixed to a vehicle body (not shown) through a knuckle 30.

At this time, the coupling between the knuckle 30 and the shaft 110 can be achieved in various manners.

For example, the knuckle 30 may be coupled to the driving shaft by welding, or thermal fitting or using a pin or key as shown in FIG. 7. Alternatively, as shown in FIG. 8, the knuckle 30 may be formed integrally with the driving shaft 110 through mold casting.

In the meantime, a structure for coupling the driving shaft 110 to the vehicle body is not necessarily achieved by the knuckle 30 as described.

For example, a rear surface of the shaft 110 may be directly fixed to the vehicle body, or the shaft 110 may be fixed to the vehicle body through an additional flange. The configuration may be varied depending on a use of a vehicle. It is preferable to adapt the structure to a use of a vehicle.

Accordingly, if the in-wheel motor operates, the rotation of the outer housing 500 caused by the rotation of the outer rotor 400 causes the rim wheel 21 to rotate, and accordingly the wheel 20 rolls. In a process of rolling the wheel 20, the air outside of the in-wheel motor is repeatedly introduced into and then discharged from an internal space of the in-wheel motor through the openings formed on the rim wheel 21 of the wheel 20, so that the air is heat-exchanged with the main cooling part 300 thereby lowering the temperature of the stator 200.

The invention claimed is:

1. An outer rotor-type motor, comprising:
    a stator block formed in the shape of a cylinder, the stator block being installed on a shaft passing through a central portion of the stator block;
    a stator fixedly installed on an outer circumferential surface of the stator block;
    a main cooling portion provided on an inner circumferential surface of the stator block to lower temperature of a corresponding portion;
    an outer rotor rotatably installed at an outside of the stator; and
    an outer housing having a circumferential portion fixed to a front circumferential portion of the outer rotor and an inside portion rotatably installed on the shaft.

2. The outer rotor-type motor as claimed in claim 1, wherein the main cooling part comprises one or more groove recessively formed along an inner circumferential surface of the stator block, the grooves being formed on the inner circumferential surface of the stator block in plural numbers in an axial direction or formed in the shape of a spiral.

3. The outer rotor-type motor as claimed in claim 1, wherein a concavo-convex portion is formed on an inner wall surface of the groove.

4. The outer rotor-type motor as claimed in claim 1, further comprising an auxiliary cooling part provided on an outer circumferential surface of the outer rotor to for heat-exchange with external air.

5. The outer rotor-type motor as claimed in claim 4, wherein the auxiliary cooling part comprises one or more grooves recessively formed along an outer circumferential surface of the outer rotor, the grooves being formed on the outer circumferential surface of the outer rotor in plural numbers formed in the shape of a spiral.

6. The outer rotor-type motor as claimed in claim 1, wherein a plurality of first ventilation holes for allowing an internal space of the stator block to communicate with an outside thereof are formed on a rear surface of the stator block.

7. The outer rotor-type motor as claimed in claim 6, wherein the outer housing is formed with a plurality of second ventilation holes for allowing the internal space of the stator block to communicate with an outside of the outer housing.

8. The outer rotor-type motor as claimed in claim 1, wherein the stator block has a fluid-flow passage formed therein for guiding flow of fluid such as refrigerant, water or gas, and the fluid-flow passage communicates with a cooling device for cooling refrigerant or fluid and then providing it.

9. The outer rotor-type motor as claimed in claim 1, further comprising an inner housing having a circumferential fixed to a rear circumferential of the outer rotor and an inside portion rotatably supported by the stator block.

10. The outer rotor-type motor as claimed in claim 9, wherein a reception groove is formed on a rear circumferential of the stator block in a circumferential direction thereof, and a reception protrusion is formed to protrude on an inner portion of the inner housing to be accommodated and supported in the reception groove.

11. The outer rotor-type motor as claimed in claim 10, further comprising a sealing member contained in the reception groove to seal a gap between the reception groove and the reception protrusion when the reception protrusion is accommodated in the reception groove.

12. An outer rotor-type in-wheel motor, comprising:
    a stator block formed in the shape of a cylinder, the stator block being installed on a shaft passing through a central portion of the stator block;
    a stator fixedly installed on an outer circumferential surface of the stator block;
    a main cooling portion provided on an inner circumferential surface of the stator block to lower temperature of a corresponding portion;
    an outer rotor rotatably installed at an outside of the stator; and
    an outer housing having a circumferential portion fixed to a front circumferential portion of the outer rotor and an inside portion rotatably installed on the shaft, wherein the outer housing is fixedly coupled to a wheel, and the shaft is coupled to a vehicle body.

13. The outer rotor-type in-wheel motor as claimed in claim 12, wherein the shaft is coupled to the vehicle body through a knuckle.

14. The outer rotor-type motor as claimed in claim 13, wherein the shaft is formed integrally with the knuckle.

* * * * *